Nov. 10, 1970   W. L. HINKS ET AL   3,538,690
SICKLE BAR
Filed March 20, 1967   5 Sheets-Sheet 1
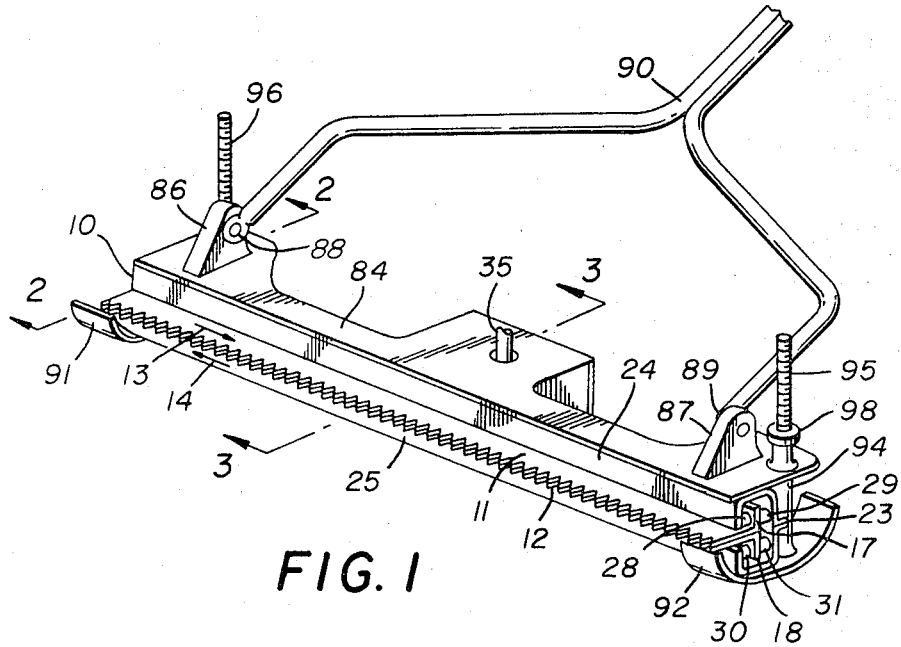
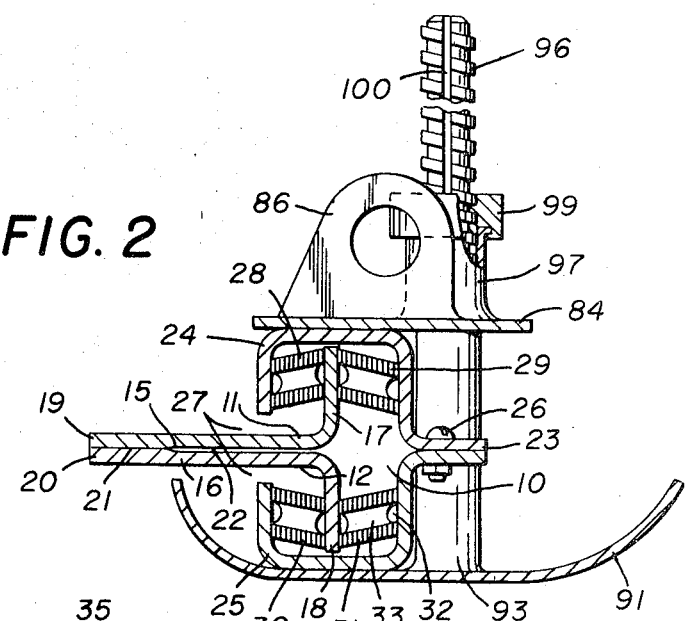
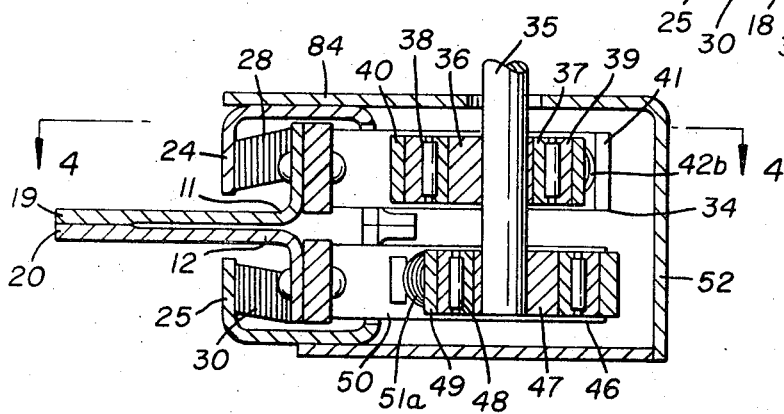
INVENTORS
WILLIAM L. HINKS &
NICK D. DIAMANTIDES

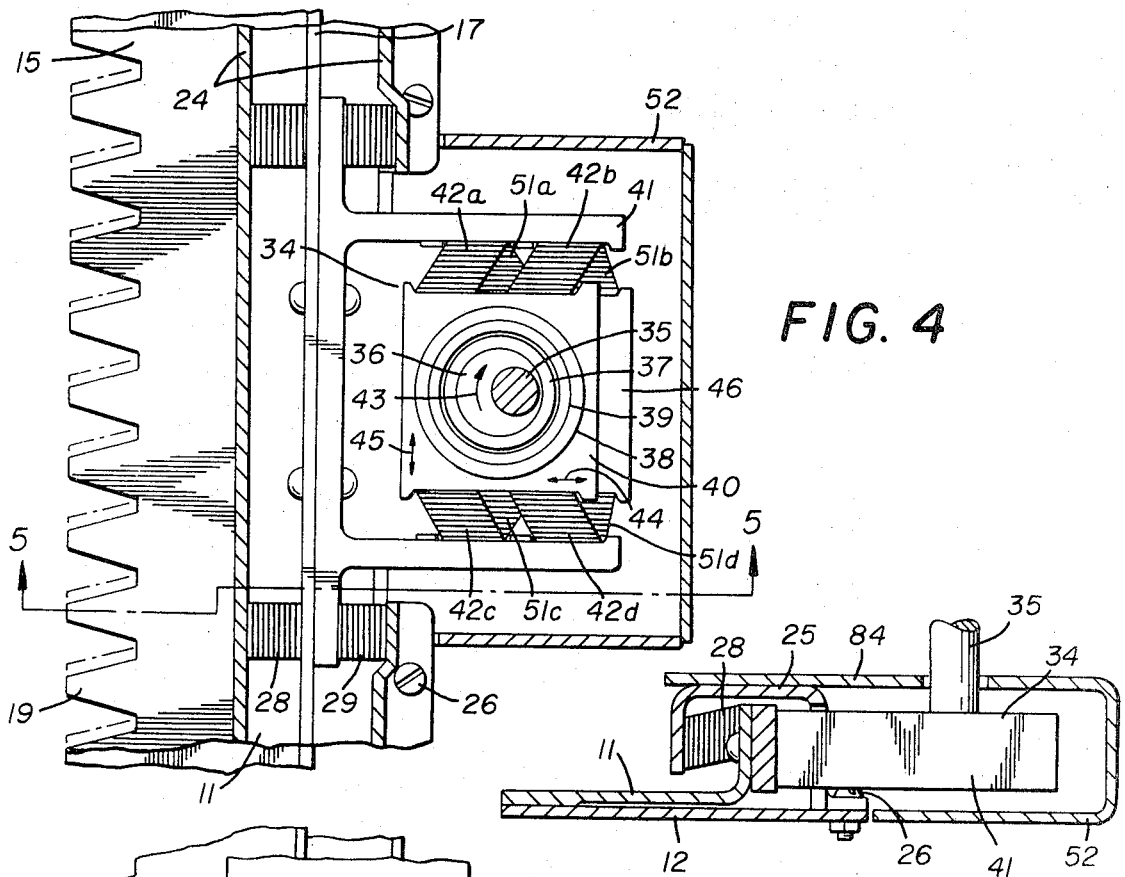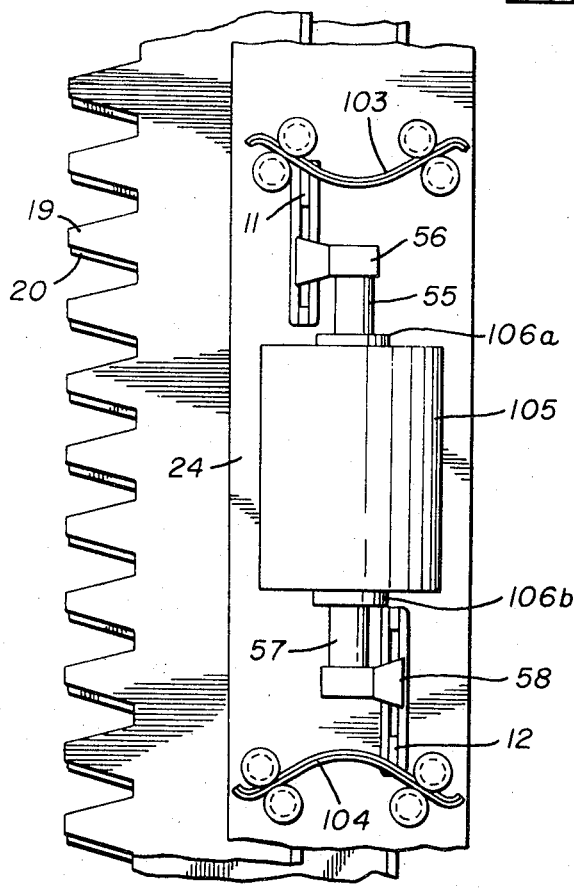

Nov. 10, 1970     W. L. HINKS ET AL     3,538,690

SICKLE BAR

Filed March 20, 1967     5 Sheets-Sheet 3

INVENTORS
WILLIAM L. HINKS &
NICK D. DIAMANTIDES

INVENTORS
WILLIAM L. HINKS &
NICK D. DIAMANTIDES

Nov. 10, 1970  W. L. HINKS ET AL  3,538,690
SICKLE BAR

Filed March 20, 1967  5 Sheets-Sheet 5

INVENTORS
WILLIAM L. HINKS &
NICK D. DIAMANTIDES

United States Patent Office 3,538,690
Patented Nov. 10, 1970

3,538,690
SICKLE BAR
William L. Hinks, 2449 Kensington Ave., Bath, Ohio 44210, and Nick D. Diamantides, 2517 14th St., Cuyahoga Falls, Ohio 44223
Filed Mar. 20, 1967, Ser. No. 624,293
Int. Cl. A01d 53/10
U.S. Cl. 56—26.5
14 Claims

ABSTRACT OF THE DISCLOSURE

A device comprising two tooth-edged bars in a combination suitable for a sickle bar operation powered by mechanical drive means. The two bars are arranged in a manner conducive to a positive contact between the toothed edges through resilient supports. The bar mass in combination with the resilience of the supports may be so selected as to resonate at the speed of the drive means for the purpose of increasing efficiency and dynamic balance, and reducing weight and wear.

---

The present invention relates to a sickle bar utilized in power mowers for cutting lawn grass or other plant growth.

Conventional cutter assemblies in ordinary lawnmowers are of two main types both of which suffer from shortcomings inherent to their basic design.

The first type is a relatively massive cylindrical reel rotating about its geometric axis, kept parallel to the ground surface, and carrying a number of helically shaped cutting blades. Those versed in this art are aware of the mechanical complexity and cost involved in the manufacture of such cutters in addition to the heavy weight and to the danger of injury to the operator posed by the fast rotating blades between which a limb may be mangled.

The second type is a rotor formed by radially extending flat scythes that rotate at high speed parallel to the ground. Those versed in this art are aware of the high rate of injuries inflicted on operators by the long knife edges of the scythes kept in a unidirectional motion under high speed, and of the clumping, instead of dispersing, effect the rotor may have on the grass cutting. Both cutter designs suffer from the additional shortcoming of limiting the cutting surface within the horizontal projection of the supporting structure and, therefore, preventing the cutting of the grass close enough to a wall, fence, hedge or pavement.

Difficulties of the aforesaid character may be avoided in the unique configuration which is the object of our invention.

Accordingly, it is one of the objects of the present invention to provide an improved sickle bar whose working parts are held together in a way conducive to a position sliding contact, to a dynamic balance and to a resonance condition minimizing power requirements.

It is another object of the invention to provide a sickle bar apparatus of simplified design entailing low cost.

A further object is to provide a sickle bar of increased efficiency and mechanical simplicity allowing for trouble free operation, minimum maintenance and parts replacement.

It is another object to provide a sickle bar of light construction and weight making for easy handling and transporting, and necessitating only a small engine thus minimizing potential damage to people and property and reducing fuel expenditure.

Another object is to provide a sickle bar through which the cutting surface of a mower may be extended up to the front and side edges of the apparatus' horizontal projection thus making additional trimming unnecessary.

These and other objects as well as a fuller understanding of this invention may be had by referring to the following description and claims, taken in conjunction with the accompanying drawings, in which:

FIG. 1 is a perspective view of the sickle bar showing the two member bars held in position inside the bar holder by elastomeric supports, the sickle bar being incorporated in a lawn mower design.

FIG. 2 is a sectional view corresponding to section 2—2 of FIG. 1 and showing in detail the sickle bar and its elastomeric supports as well as the bar holder.

FIG. 3 is a sectional view corresponding to section 3—3 of FIG. 1 and illustrating the dual-eccentric drive that imparts the necessary sliding motion to both blades of the sickle bar.

FIG. 4 is a plan section view, partially cut away, corresponding to the section 4—4 of FIG. 3 and further illustrating the dual-eccentric drive.

FIG. 5 illustrates a single eccentric drive that imparts a sliding motion to only one of the blades of the sickle bar.

FIG. 6 is a plan view of the solenoid drive that may be used to power the sickle bar.

Figure 7:
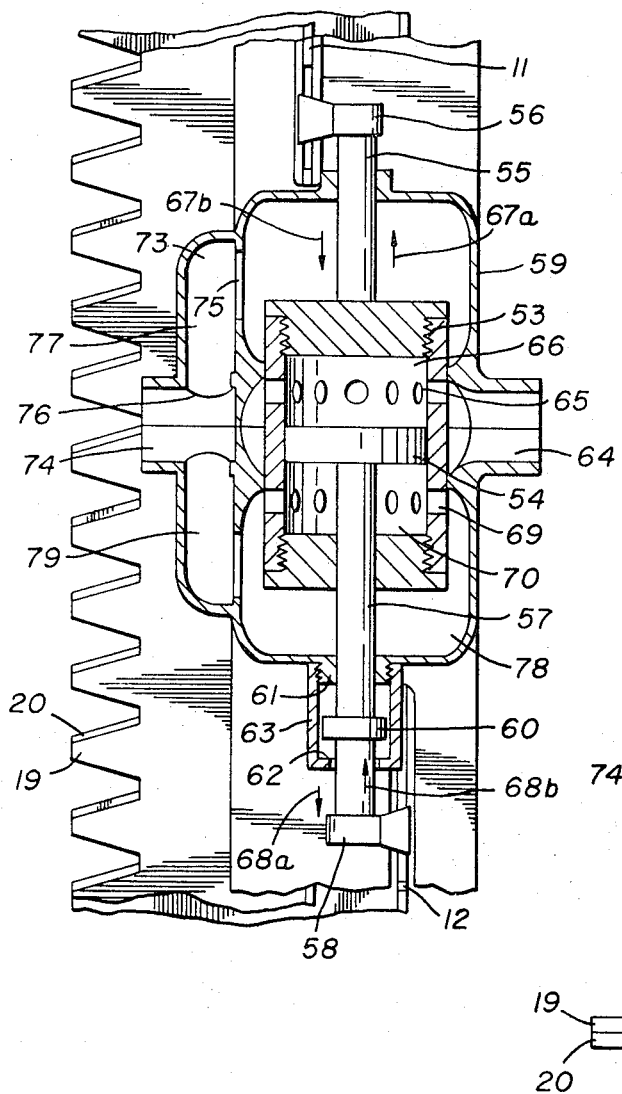
FIG. 7 is a sectional plan view of a reciprocating hydraulic motor that may be used to power the sickle bar in place of a rotational gas engine or electric motor.

The underlying concept of the invention is sketched in FIG. 1 and will now be described.

The sickle bar 10 consists of two metallic member bars 11 and 12 held together in a way that permits sliding reciprocating motion, indicated by the arrows 13 and 14, of the one member with respect to the other. As shown in FIG. 1 and, in greater detail, in FIG. 2, each member bar has an L-shaped cross section comprising the cutting blade 15 or 16 and the rib 17 or 18. The edge of the cutting blade 15 is formed into a row of teeth 19, and the edge of the cutting blade 16 is formed into a row of teeth 20. The two rows of teeth are kept in contact with each other over the whole length of the blades and over the depth of the teeth's surface 21. By contrast a small gap 22 separates the two cutting blades to eliminate friction at the nontoothed portion of the sliding bars as well as to insure positive contact at the teeth. The teeth are antiwearhardend through any one of several existing metallurgical procsses such as case hardening or the technique of imbedding particles of tungsten carbide into the surface of the metal.

The two member bars 11 and 12 are mounted inside the bar holder 23 consisting of two channels 24 and 25 held together by means of screws 26. The holder 23 features a lengthwise opening 27 through which the cutting blades 15 and 16 protrude freely. This arrangement of member bars will be referred to hereafter as the configuration of opposing-L cross section.

Member bar 11 is held in place through its rib 17 by means of two rows of elastomeric bearings. In FIG. 2 only one such bearing, 28, may be seen from the one row and another such bearing, 29, from the other row. Member bar 12 is similarly held in place through its rib 18 by means of two rows of elastomeric bearings with only one bearing 30 and 31 shown from each row. The elastomeric bearings are held in compression between rib 17 and channel 24, or between rib 18 and channel 25, as the case may be.

Each elastomeric bearing consists of a stack of thin metal laminates of flat washer-like form made of brass or steel, adhered together by alternating layers of elastic rubber or other rubber-like material. Such a layer of rubber, adhered between metal laminae can withstand high compressive loads applied by the metal layers, it being sufficiently thin as to be restrained from substantially flowing sidewise by its adhesion to the metal. Elastomeric bearings, however, are capable of a deformation in shear parallel to the laminae accompanied by shear stress proportional to the deformation. Thus the elastomeric bearing behaves in a spring-like fashion and its spring rate may be adjusted as desired through proper selection of the dimensions of the stack and characteristics of the elastomer. This spring rate is little affected by the compressive forces. Each bearing is compressed perpendicularly to its layers and is held in place by means of a raised spot, such as 32, provided on the metal surfaces and accommodated inside the central hole 33 of the bearing. Other means of securing the bearings on the metal surfaces should be obvious to those versed in the mechanical art. The bearings of each row may be spaced approximately 1.5 inches to 3 inches apart or as required for adequate support. Two significant aspects of the use of elastomeric bearings as the sickle bar support means are now emphasized: Firstly, each bearing is prestressed in shear. This is indicated in FIG. 2 by the fact that the longitudinal axis of each bearing is not perpendicular to the blade ribs 17 or 18, or to the walls of the holder channels 24 or 25 as the case may be. Instead, the bearing axis is moved from its normal right angle to form an angle of less than 90 degrees with the aforesaid rib and holder walls. This prestressing or preloading in shear is such as to apply a constant force on the two member bars 11 and 12 because of which force a positive contact is secured between the cutting blades 15 and 16. The creation of this constant force urging the two blades toward each other is an important feature of the present invention.

Secondly, an important beneficial feature of the elastomeric bearings is their capability, with proper design, to withstand indefinitely without lubrication and without fatigue and failure such a reciprocating or vibratory motion as they are subjected to by the sickle bar.

Either one or both member bars 11 and 12 are forced to reciprocate in opposite directions with respect to each other by power means that may be actuated electrically, hydraulically, or mechanically as in internal combustion engines. When both member bars are thus driven the result is equal and opposing accelerations on the two moving masses of the aforesaid member bars and, therefore, a dynamic balance of the sickle bar as a whole as well as vibration suppression throughout the structure carrying the sickle bar.

FIGS. 3 and 4 illustrates means 34 of coupling the member bar 11 to the rotating shaft 35 of an ordinary electric motor or gas engine. The aforesaid coupling is effected by means of an eccentric cylindrical cam 36 rigidly affixed to the shaft 35 and held inside the inner race 37 of a rolling element bearing 38. The outer race 39 of the same bearing is press-fitted into the block 40 and this, in turn, is mounted on the bracket 41 by means of four elastomeric bearings 42a, 42b, 42c, and 42d. The bracket 41 is rigidly affixed on the rib 17 of the member bar 11. It will be appreciated that as the cam 36 is driven to rotation in the direction of the arrow 43, it imparts, through the bearing 38, two orthogonal translational motions to the block 40: One motion indicated by the double-pointed arrow 44 is a motion that does not contribute to the desired movement of the bar 11 and is accommodated by the free shear deformation of the four elastomeric bearings 42a, 42b, 42c, 42d. The other motion indicated by the double-pointed arrow 45 is transmitted to the bracket 41, on account of the restricted compressibility of the aforesaid elastomeric bearings, and from the bracket to the member bar 11.

In a similar fashion coupling means 46 connects the members bar 12 to the shaft 35; said means comprise a second eccentric cylindrical cam 47 affixed on the shaft 35 and transmitting a reciprocating motion to the member bar 12 by means of a rolling element bearing 48 and of a block 49 mounted on a bracket 50 rigidly affixed to the member bar 12. The block 49 is carried by the bracket 50 by means of four elastomeric bearings 51a, 51b, 51c, 51d.

It will be appreciated that, because the cams 36 and 47 are positioned 180 degrees apart about the shaft 35, the motions imparted to the member bars 11 and 12 are always of equal and opposite amplitudes. Consequently, the action is accomplished under optimum conditions of dynamic balance. A cover box 52 serves to protect the coupling means 34 and 46 from foreign matter or other damage.

The simpler arrangement of driving only the upper member bar 11 by the engine is shown in FIG. 5. As seen there the bar holder consists of only one channel 25; the other channel being replaced by the member bar 12 itself; the latter is now flat instead of L-shaped and is affixed to channel 25 by means of screws and nuts 26. This arrangement of member bars will be referred to hereafter as the configuration of a single-L cross-section. It should be obvious that the arrangement will work equally well if turned upside down except for the shaft 35 which will remain pointing upward.

Besides the rotating shaft type prime mover, reciprocating types of motors may be readily used to power the sickle bar. One such motor will be a conventional two-plunger electric solenoid shown in FIG. 6, whose one plunger 106a will be affixed to member bar 11 by means of an output rod 55 and bracket 56, and whose other plunger 106b will be affixed to member bar 12 by means of an output rod 57 and a bracket 58. The solenoid coil 105 is affixed to the top channel 24 of the bar holder. When such a solenoid is connected to a 60 c.p.s. alternating current, the two plungers will be urged toward each other hundred and twenty times per second, imparting their stroke to the two member bars 11 and 12. On the other hand, by means of a solid-state electric circuit inserted in series with the solenoid this rate may be reduced to sixty or thirty times per second or less.

Another type of reciprocator is a simple hydraulic motor powered by the water supply normally available in residential areas. As seen in FIG. 7 the motor consists of a cylinder 53 containing a piston 54, both piston and cylinder moving with respect to each other. The cylinder 53 is connected to the member bar 11 by means of an output rod 55 and a bracket 56, or by other suitable means. The cylinder 53 could be affixed to the barholder if only one member bar is driven.

Similarly, the piston 54 is connected to the member bar 12 by means of an output rod 57 and a bracket 58. A sliding jacket 59, whose position relative to the cylinder 53 is controlled by the stroke of the rod 57 through the shoulder 60 and the sidewalls 61 and 62 of the spacer 63, channels the water flow to the one or the other side of the piston 54. Thus in the position shown in FIG. 7 water from the intake pipe 64 finds the row of ports 65 open and, through them, enters the chamber 66 pushing the cylinder 53 in the direction of the arrow 67a and the piston 54 in the direction of the arrow 68a. As the shoulder 60 moves in the direction of the arrow 68a it eventually pushes against the sidewall 62 thus moving the jacket 59 also in the direction 68a. This interrupts the flow into the ports 65 and channels it to the now open ports 69 and the chamber 70. Hence, the cylinder is now pushed in the direction of the arrow 67b and the piston in the direction of the arrow 68b. In the course of this stroke the ports 65 are open into the chamber 73 thus emptying chamber 66 into 73, and from there into the outlet 74 through the openings 75 and 76 and the duct 77. At the end of the present stroke the shoulder 60 pushes against the side-wall 61 and moves the sliding jacket 59 in the direction of the arrow 67a opening again the ports 65 and connecting the chamber 70 to the chamber 78 and from there to the duct 79 and the outlet 74. Because of these strokes of the cylinder 53 and the piston 54 the rods 55 and 57 are forced into opposite reciprocating motion which of course is transmitted to the member bars 11 and 12.

Figure 8:
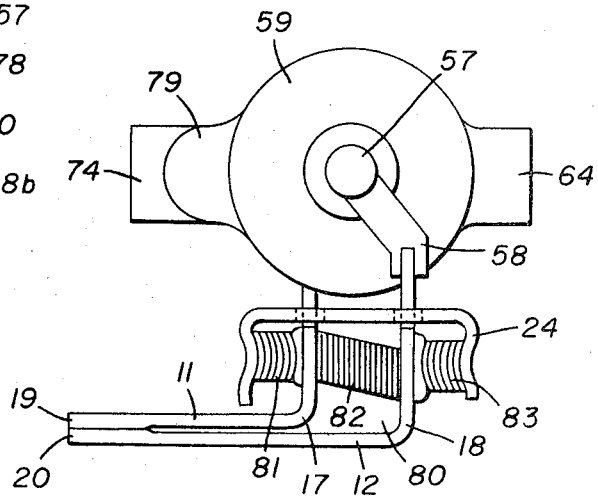
FIG. 8 is a side elevated view of the hydraulic motor.

As may be seen in FIG. 7 and, more clearly, in FIG. 8, the aforesaid hydraulic motor or reciprocator favors the arrangement 80 of the member bars 11 and 12 which differs from the arrangement shown in FIGS. 2 and 3 in that both ribs 17 and 18 are directed upward. This, among other things, reduces the number of rows of elastomeric bearings from four to three, 81, 82, 83, and will be referred to hereafter as the configuration of a nested-L cross section. As illustrated in FIG. 8, bearings 81 and 83 are arcuate in cross section for the purpose of accurately positioning and securely maintaining the two member bars in a positive juxtaposition relatively to one another and the bar holder 24, resisting any lateral forces acting in the plane of the paper parallel to the ribs 17, 18. The alternate arrangement 80 may also be powered by a rotating shaft type of motor or engine.

Regarding the various means of driving the sickle bar described above, it should be emphasized that the rotating shaft drive and the hydraulic motor drive are in essence displacement sources in which the displacement amplitude is determined by the eccentric radius or the piston stroke respectively. On the other hand, the solenoid type of drive is more nearly a force source. In this latter case, pictured in FIG. 6, the amplitude of the motion of the member bars 11 and 12 is determined by the degree of tuning of the spring-mass system and the amount of damping caused by the friction between the moving parts, the work of grass-cutting, and the internal friction in the elastomeric bearings. When the sickle bar is activated but is running idle, the absence of load may allow the amplitude to become excessive. To prevent this, the spring cushions 103 and 104 affixed on the bar holder 24 serve to absorb the excess kinetic energy. Because the aforesaid cushions are made of steel leaves they dissipate this excess kinetic energy in the form of friction heat generated between the leaves.

At this point the important feature of mechanical resonance that may be effected by the sickle bar assembly of the present invention should be pointed out. The total spring rate per member bar due to the elastomeric bearings supporting said member bar may be so adjusted that in combination with the mass of the bar causes the spring-mass system to resonate at a frequency of $f$ cycles per second. Specifically, if W is the weight of the moving mass in pounds and S the spring rate in pounds per foot, then the following relationship holds between $f$, W and S, $$f = 0.84\sqrt{\frac{S}{W}}$$

This frequency is selected to substantially coincide with the frequency of rotation or reciprocation of the engine or motor that forces the two member bars 11 and 12 into a reciprocating sliding motion 13, 14. In this manner a condition of resonance or tuning is established which balances the inertial forces of the moving mass against the spring forces of the bearings. This resonance condition, while beneficial in many respects, may cause excessive amplitude of member bar motion in the case of a substantially force source type of driving means like the already mentioned solenoid. The aforesaid cushions 103 and 104 met by the oscillating parts at the end of the latters' stroke increase in effect the spring rate S and with it the resonance frequency $f$. Because, however, the frequency of the driving force remains fixed, the spring-mass system is operated off-tuning which materially limits the member bar motion amplitude at the end of the stroke.

It will be appreciated that other means of providing a cushioning effect and higher spring rate at the ends of desired motion are possible, such as a rubber bumper.

The sickle bar 10 as described so far is shown incorporated into one of many possible lawnmower designs in FIG. 1 where it is pictured rigidly attached to the top plate 84. The supports 86 and 87 welded on the top plate 84 carry the supports 88 and 89 for the adjustable attachment of the push fork 90 which in turn carries the handle bars. The top plate 84 is mounted on two skis 91 and 92 by means of a column 93 (hidden) and 94 respectively. The upper part of each column is formed into a screw thread 95 and 96. The top plate 84 is supported on to the threads 95 and 96 by means of sleeves 97 (hidden) and 98. Details of the latter may be seen in FIG. 2. A nut 99 freely rotating on the sleeve 97, but otherwise inseparable from it, raises or lowers the top plate 84 and sickle bar 10 according to the desired distance of the cutting blades 15 and 16 from the ground. A channel 100 on the screw 96, and a corresponding ridge inside the sleeve 97 prevents rotation between the screw 96 and the sleeve 97. In the position shown in FIG. 2 the sickle bar is at the lowest possible level, its bottom touching the ski 91.

Figure 9:
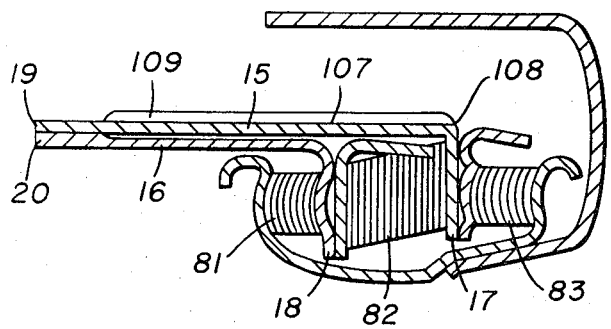
FIG. 9 is a sectional view from FIG. 10 of an alternate shape of the sickle bar.
Figure 10:
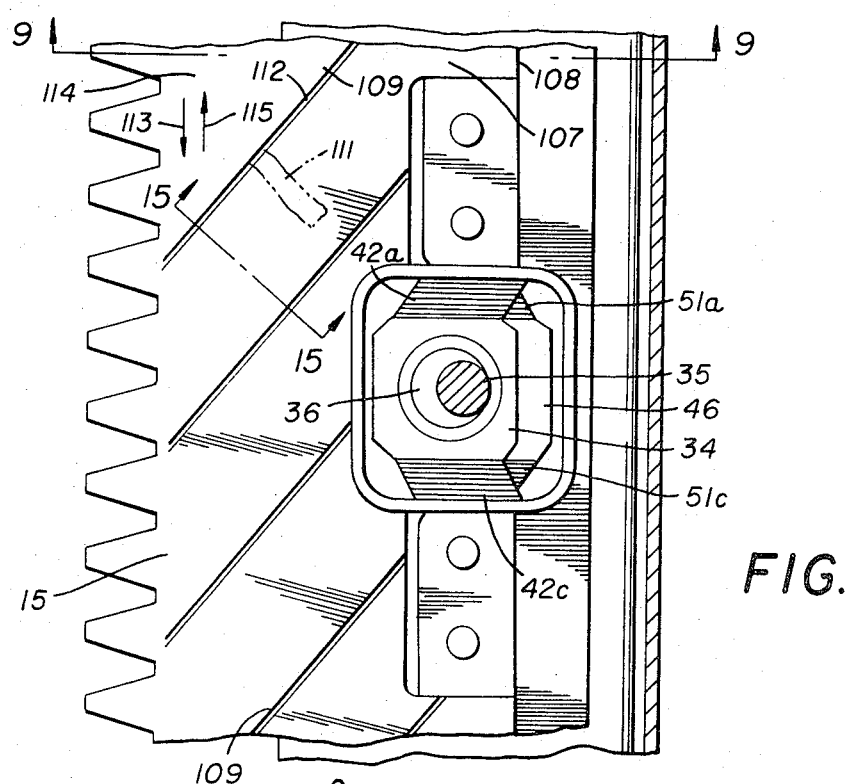
FIG. 10 is a plan view of the alternate shape of the sickle bar of FIG. 9.

Although in the foregoing discussion the sickle bar is shown with its member bars arranged either in opposing-L or parallel-L cross sections, it should be obvious to those versed in this art that many other cross section shapes will work equally well. An example of such shape is seen in FIGS. 9 and 10. Furthermore, the present invention's basic feature of a constant force urging the two member bars toward each other may be achieved by resilient means other than the elastomeric bearings already described. An arrangement of such means is shown in FIGS. 11, 12, and 13.

Figure 15:
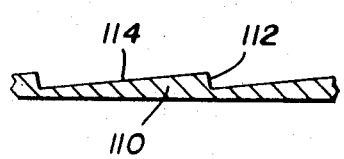
FIG. 15 is a sectional view of the top surface of the upper member bar in FIG. 10.

In the configuration shown in FIGS. 9 and 10, which will be referred to hereafter as the configuration of an inverted nested-L cross section, the topmost surface 107 of the upper cutting blade 15 is free from obstructions which may cause accumulation of grass cuttings on the sickle bar. In addition, said surface 107 is shaped to facilitate the movement of said grass cutting toward the rear edge 108 of the blade 15. This is accomplished by the ridges 109 formed obliquely over the length of the blade 15 and having a cross section in the shape of an asymmetric triangle 110, FIG. 15. It will be appreciated that because of the member bar's reciprocating motion a grass cutting 111 that happened to fall between any two ridges will be eased toward the rear edge 108 by the steep side 112 of a ridge during the blade stroke represented by the arrow 113. By contrast, the grass cutting 111 will slide over the gently sloping side 114 of a ridge during the blade stroke represented by the arrow 115.

Figure 11:
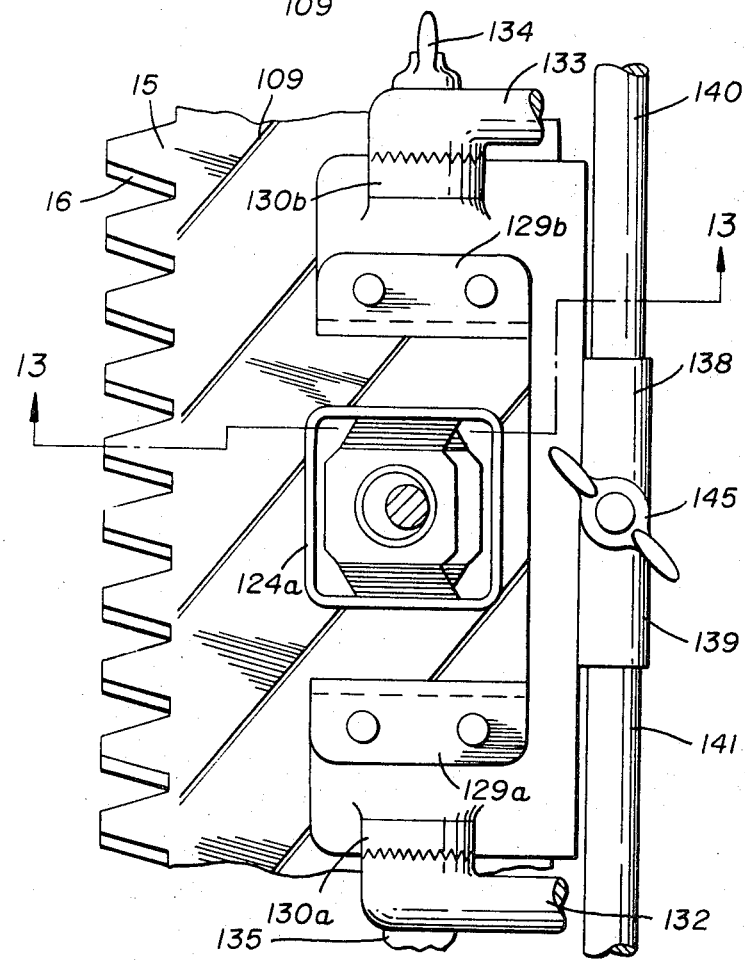
FIG. 11 is a plan view of the sickle bar arrangement in which prestressing of the member bars themselves secures a positive contact between the bars as well as a reciprocating motion of both bars.
Figure 12:
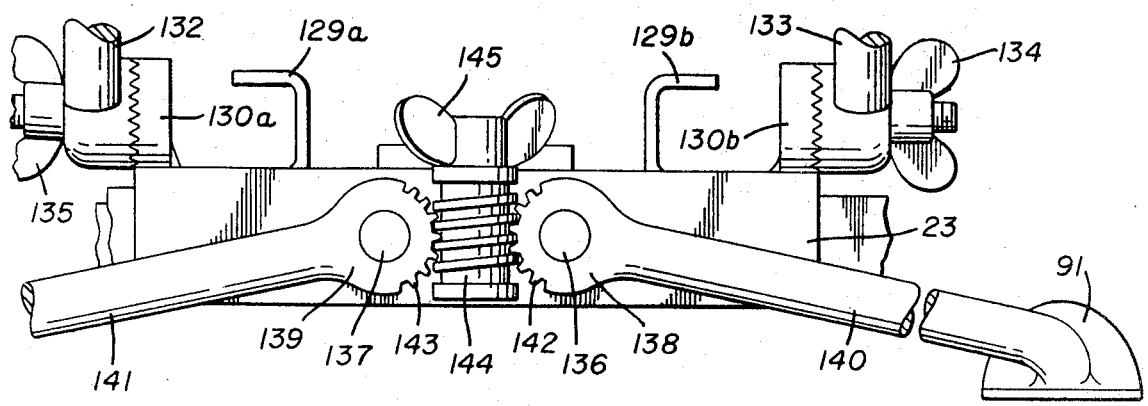
FIG. 12 is an elevated view of the sickle bar arrangement of FIG. 11.
Figure 13:
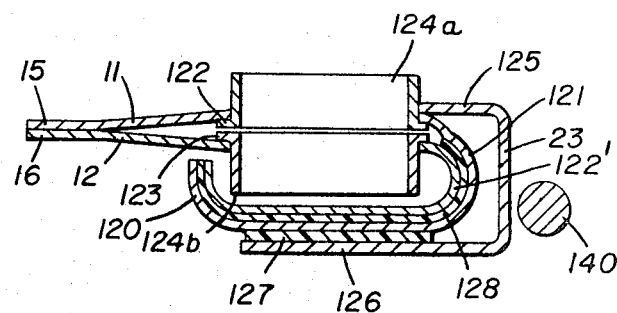
FIG. 13 is a sectional view of the sickle bar arrangement of FIG. 11.

In the arrangement shown in FIGS. 11, 12 and 13 the two member bars 11 and 12 are made of a resilient material, such as stainless steel, have a hairpin-like cross section 120 and are telescoped into one another. The bending of member bar 11 at the elbow region 121 and the bending of member bar 12 at the elbow region 122' are such that when member bar 12 is inserted into member bar 11 there is a net force urging the cutting blades 15 and 16 toward each other much as the elastomeric bearings are doing in the previously described sickle bar cross sections. Cutouts 122 and 123 in the middle region of the member bars 11 and 12 respectively accommodate the receptacles 124a and 124b that serve to receive the eccentric means 34 and 46 previously described in conjunction with FIGS. 3 and 4; through these eccentric means the two member bars are driven to a reciprocating motion by the engine shaft 35. The receptacles 124a and 124b are held on the respective member bars 11 and 12 by means of brazing. The two member bars are held together between the legs 125 and 126 of the bar holder 23 by means of a bearing 127, made of a bearing material such as fiberglass-reinforced tetrafluorethylene, and rigidly affixed to the inner surfaces of the bar holder 23. A second bearing 128, made of the same material separates the two member bars along their surfaces of mutual contact to insure against excessive friction and wear. The supports 129a and 129b, being integral parts of the bar holder, serve to support the engine or motor that powers the sickle bar. An additional pair of supports 130a and 130b, also integral parts of the bar holder, serve for the adjustable attachment of the push-fork tines 132 and 133. The setting of the tines is assured by means of wingnuts 134 and 135. Finally, the axles 136 and 137, which are also integral parts of the bar holder 23, carry the cylindrical sockets 138 and 139 and these are rigidly attached to the legs 140 and 141 which, in turn, carry the skis 91 that support the sickle bar on the ground. Part of the outer periphery of each socket is shaped into a gear 142 and 143 engaged by the worm 144 equipped with the adjustor wingnut 145. By turning the wingnut 145 in the proper direction the legs may be rotated upward or downward thus setting the height of the grass after mowing.

Figure 14:
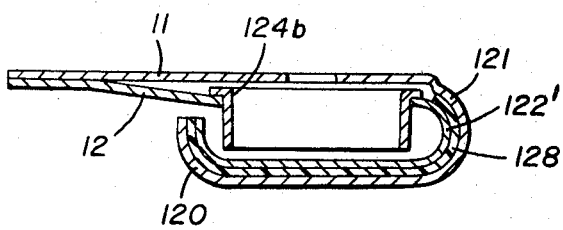
FIG. 14 is a sectional view of a sickle bar as in FIG. 13 allowing for a reciprocating motion of only one member bar.

It will be appreciated that the hairpin-like cross section arrangement of member bars may also be driven by reciprocating power means such as an electric solenoid or a hydraulic motor. Furthermore, that a spring or springs may be included between the two member bars through which the mechanical resonance condition previously discussed may be effected. The arrangement of member bars 11 and 12 shown in FIG. 14 is in all respects identical to that of FIG. 13 excepting the fact that only member bar 12 is equipped with the receptacle 124b for the accommodation of the eccentric means that couple the same member bar to the engine shaft. The member bar 11 in this case remains immobile during operation and replaces the bar holder in its function of carrying the supports for the engine, the push fork, and the skis. By contrast only member bar 12 is subjected to a reciprocating motion. Under this arrangement the two member bars are again separated by a bearing 128 made of such bearing material as fiberglass-reinforced tetrafluorethyne.

Although this invention has been described in its preferred form with a certain degree of particularity, it is understood that the present disclosure of the preferred form has been made only by way of example and that numerous changes in the details of construction and the combination and arrangement of parts and configurations may be resorted to.

What is claimed is:
1. A sickle-bar cutting device comprising:
   (A) two long member bars
      (1) each of said member bars having a forwardly projecting cutting blade with a row of teeth formed thereon to define a toothed edge, said teeth having cutting sides and being spaced longitudinally on each cutting blade such that said cutting sides of one said member bar are placed in cooperative cutting relation to said cutting sides of the other member bar,
      (2) at least one of said member bars having a rearward rib disposed at an angle to said cutting blade to form an L-shaped cross section, and
   (B) bearing and holding means
      (1) including a plurality of laminated elastomeric bearings, each of said bearings being stacked alternating layers of ruber and metal adhered together, said bearings allowing motion between their outer layers in a direction parallel to said layers and having spring-like properties, said laminated bearings being spaced longitudinally in pairs along said rearward rib and engaging said rearward rib in a position in which said layers are parallel to said rearward rib, each of the members of said pairs being in opposing relation on opposite sides of said rearward rib, and
      (2) including means abutting and securing said laminated bearing pairs to said rearward rib, and
      (3) relatively positioning said member bars through said securing means in longitudinally aligned and reciprocably moveable relation to each other with said cutting blades juxtaposed in contact along said toothed edges and having a gap between said blades in a rearward non-toothed region, and with said laminated bearings being preloaded in shear to thereby force the teeth of one said member bar against the teeth of the other said member bar, and
   (C) mechanical power drive means
      (1) causing said member bars to reciprocably move relative to each other in a direction parallel to said layers of said bearings to produce a shearing action between said cutting sides of said teeth.

2. The sickle bar device of claim 1, wherein said mechanical power drive means includes an electrically actuated solenoid.

3. The sickle bar device of claim 1, wherein said mechanical power drive means includes a hydraulic reciprocating motor.

4. A sickle bar cutting device comprising:
   (A) two long member bars
      (1) each of said member bars having a forwardly projecting cutting blade with a row of teeth formed thereon to define a toothed edge, said teeth having cutting sides and being spaced longitudinally on each said cutting blade to provide a mating relation between said member bars,
      (2) at least one of said member bars having a rearward rib disposed at an angle to said cutting blade to form an L-shaped cross section, and
   (B) bearing and holding means
      (1) including a plurality of laminated elastomeric bearings, each of said bearings comprising a stack of thin metal layers adhered together by alternating thin layers of elastomer, said bearings allowing motion between their outer layers in a direction parallel to said layers and having spring-like properties, said laminated bearings being arranged with their layers parallel to said rearward rib with said rearward rib being secured between opposed rows of said bearings, and
      (2) including at least one channel between the sides of which said opposed rows of said bearings are secured, and
      (3) relatively positioning said member bars through said channel and said bearings in longitudinally aligned and reciprocably moveable relation to each other with said cutting blades in juxtaposed abutting relationship along said toothed edges and having a gap between said cutting blades in their rearward non-toothed region, and with said laminated bearings being preloaded in shear to produce said abutting relationship between said cutting sides of said cutting teeth, and
   (C) mechanical power drive means
      (1) providing a source of relative, longitudinal, reciprocating, motion between said member bars to produce a shearing action between said cutting sides of said cutting teeth.

5. The sickle bar device of claim 4, wherein said power drive means includes a rotating shaft and eccentric means linking said rotating shaft to at least one of said member bars, said eccentric means transforming the rotary motion of said shaft into said reciprocating motion between said member bars.

6. The sickle bar device of claim 5, wherein said eccentric means includes an eccentric cylindrical cam affixed to said rotating shaft, said eccentric cylindrical cam being held within a rolling element bearing, said rolling bearing being carried by a block supported by a second laminated elastomeric bearing means on a bracket, said bracket being affixed to said member bar.

7. The sickle bar device of claim 4, wherein each of said member bars has an L-shaped cross section comprising said cutting blade and said rearward rib, said member bars being arranged in opposing L-shaped cross section such that said ribs lie on opposite sides of a plane of juxtaposition of said cutting blades.

8. The sickle bar device of claim 4, wherein said mechanical power drive means includes an electrically actuated solenoid.

9. The sickle bar device of claim 4, wherein said mechanical power drive means includes a hydraulic reciprocating motor.

10. The sickle bar device of claim 4, wherein said mechanical power drive means includes a linearly reciprocating engine, said engine having two relatively opposite moving output means respectively affixed between said member bars.

11. The sickle bar of claim 4 including at least one spring cushion affixed to said holding means, said spring cushion resisting said reciprocating motion of said member bar when the amplitude of said motion exceeds a certain limit.

12. The sickle bar device of claim 4, wherein each of said member bars has an L-shaped cross section comprising said cutting blade and said rearward rib, said member bars being arranged in nested L-shaped cross section such that said ribs lie on the same side of a plane of juxtaposition of said cutting blades.

13. The sickle bar device of claim 12, wherein said nested L-shaped cross section member bars are inverted, and the top surface of an uppermost of said member bars has ridges formed obliquely over the length of said member bar, said ridges forming an asymmetric triangle in cross section.

14. The sickle bar device of claim 4, wherein one of said member bars is rigidly secured to said holding means and the other of said member bars has an L-shaped cross section comprising said cutting blade and said rearward rib, said mechanical power drive means imparting said reciprocating motion to said L-shaped cross section member bar.

References Cited
UNITED STATES PATENTS

| | | | |
|---|---|---|---|
| 834,969 | 11/1906 | Clarkson | 56—297 |
| 1,094,260 | 4/1914 | Siegfried | 56—297 |
| 2,735,254 | 2/1956 | Huddle | 56—297 |
| 2,994,175 | 8/1961 | Williams | 56—297 |
| 3,114,230 | 12/1963 | Blaauw | 56—297 |
| 2,782,586 | 2/1951 | Specht | 56—297 X |

LOUIS G. MANCENE, Primary Examiner

J. A. OLIFF, Assistant Examiner

U.S. Cl. X.R.

56—296